US009371799B2

(12) United States Patent
Packard et al.

(10) Patent No.: US 9,371,799 B2
(45) Date of Patent: Jun. 21, 2016

(54) THRUST-REVERSER ASSEMBLIES THAT UTILIZE ACTIVE FLOW-CONTROL AND SYSTEMS AND METHODS INCLUDING THE SAME

(71) Applicant: The Boeing Company, Seal Beach, CA (US)

(72) Inventors: Nathan Owen Packard, Lake Stevens, WA (US); Daniel Paul Brzozowski, University City, WA (US); Zachariah B. Vandemark, Snohomish, WA (US); Hin-Fan M. Lau, Redmond, WA (US); Michael L. Sangwin, Lake Stevens, WA (US); Frederick W. Roos, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 103 days.

(21) Appl. No.: 14/260,809

(22) Filed: Apr. 24, 2014

(65) Prior Publication Data

US 2015/0308377 A1   Oct. 29, 2015

(51) Int. Cl.
*F02K 1/62* (2006.01)
*F02K 1/72* (2006.01)
*F02K 3/00* (2006.01)

(52) U.S. Cl.
CPC . *F02K 1/625* (2013.01); *F02K 1/72* (2013.01); *F02K 3/00* (2013.01); *F05D 2210/30* (2013.01);
(Continued)

(58) Field of Classification Search
CPC ........... Y02T 50/166; F15D 1/06; F15D 1/12; B64C 2230/04; B64C 21/04; B64C 21/06; B64C 23/06; F02K 1/72; F02K 1/28; F02K 1/32; F02K 1/38; F02K 1/383
See application file for complete search history.

(56) References Cited

U.S. PATENT DOCUMENTS 6,151,883 A * 11/2000 Hatrick ............... F02K 1/72
                                               239/265.29
8,894,019 B2 * 11/2014 Alvi .................. F15D 1/008
                                               244/200.1
(Continued)

FOREIGN PATENT DOCUMENTS

EP    1 515 035    3/2005
GB    1032113      6/1966
GB    2314818      1/1998

OTHER PUBLICATIONS

Extended European Search Report for related foreign patent EP 15 15 9855, European Patent Office, Sep. 17, 2015.
(Continued)

*Primary Examiner* — Phutthiwat Wongwian
*Assistant Examiner* — Stefan Ibroni
(74) *Attorney, Agent, or Firm* — DASCENZO Intellectual Property Law, P.C.

(57) ABSTRACT

Thrust-reverser assemblies that utilize active flow-control and systems and methods including the same are disclosed herein. The thrust-reverser assemblies define a forward-thrust configuration and a reverse-thrust configuration. The thrust-reverser assemblies include a bullnose fairing that defines a portion of a reverser duct and an active flow-control device. The active flow-control device is located to energize a boundary layer fluid flow within a boundary layer that is adjacent to the bullnose fairing to resist separation of the boundary layer from the bullnose fairing when the thrust-reverser assembly is in the reverse-thrust configuration. The methods include flowing a thrust-reverser fluid stream through the reverser duct to generate the boundary layer and energizing a boundary layer fluid flow within the boundary layer with an active flow-control device to resist separation of the boundary layer from the bullnose fairing.

20 Claims, 5 Drawing Sheets

(52) U.S. Cl.
CPC ..... *F05D 2220/323* (2013.01); *F05D 2270/051* (2013.01); *F05D 2270/17* (2013.01); *Y02T 50/671* (2013.01)

(56) References Cited

U.S. PATENT DOCUMENTS

| | | |
|---|---|---|
| 2006/0202082 A1 | 9/2006 | Alvi |
| 2009/0277155 A1 | 11/2009 | Bulin et al. |
| 2012/0091266 A1 | 4/2012 | Whalen et al. |
| 2014/0311161 A1* | 10/2014 | Bellabal ............ F01D 5/145 60/796 |

OTHER PUBLICATIONS

Chiobaca, V., et al., "An Overview of Recent DLR Contributions on Active Flow-Separation Control Studies for High-Lift Configurations," Journal Aerospace Lab, Issue 6, Jun. 2013.

Kral, L., "Active Flow Control Technology," ASME Fluids Engineering Division Technical Brief, Washington University, St. Louis, Missouri.

* cited by examiner

THRUST-REVERSER ASSEMBLIES THAT UTILIZE ACTIVE FLOW-CONTROL AND SYSTEMS AND METHODS INCLUDING THE SAME

FIELD

The present disclosure relates to thrust-reverser assemblies for jet engines, and more particularly to thrust-reverser assemblies that utilize active flow-control to energize a boundary layer fluid flow within a boundary layer adjacent to a bullnose fairing of the thrust-reverser assembly, and to systems and methods including the thrust-reverser assemblies.

BACKGROUND

Jet engines may include a thrust-reverser assembly, which may regulate flow of a bypass stream within a bypass duct of the jet engine. The thrust-reverser assembly defines a forward-thrust configuration, in which the bypass stream generates thrust in a forward direction, and a reverse-thrust configuration, in which the bypass stream generates thrust in a reverse direction that is opposed to the forward direction.

Placing the thrust-reverser assembly in the reverser-thrust configuration generally redirects the bypass stream through a reverser duct. This redirection typically includes a significant change in a direction of flow of the bypass stream, and a bullnose fairing may be utilized to define an inner, or minimum, radius of curvature of this directional change.

In order to provide a desired level of performance of the thrust-reverser assembly (or a desired magnitude of the reverse-thrust) it may be desirable to design the thrust-reverser assembly such that a boundary layer fluid flow within a boundary layer that is adjacent to the bullnose fairing does not separate from the bullnose fairing. Thus, the inner radius of curvature that is defined by the bullnose fairing may be dictated by a desired mass flow rate of the bypass stream through the reverser duct, a desired average velocity of the bypass stream through the reverser duct, and/or the desired magnitude of the reverse-thrust. This may place significant restrictions on the overall size and/or placement of a jet engine that includes the bullnose fairing. Thus, there exists a need for improved bullnose fairing assemblies for jet engines.

SUMMARY

Thrust-reverser assemblies that utilize active flow-control and systems and methods including the same are disclosed herein. The thrust-reverser assemblies define a forward-thrust configuration and a reverse-thrust configuration. The thrust-reverser assemblies include a bullnose fairing that defines a portion of a reverser duct and an active flow-control device. The active flow-control device is located to energize a boundary layer fluid flow within a boundary layer that is adjacent to the bullnose fairing to resist separation of the boundary layer from the bullnose fairing when the thrust-reverser assembly is in the reverse-thrust configuration.

In some embodiments, the thrust-reverser assemblies are configured to resist separation of the boundary layer from the bullnose fairing when the bullnose fairing defines a radius of curvature that is less than a conventional radius of curvature of a conventional bullnose fairing that does not include the active flow-control device. In some embodiments, the active flow-control device is configured to resist separation of the boundary layer from the bullnose fairing when an average thrust-reverser fluid flow speed through the reverser duct is at least 100 m/s and less than 350 m/s.

In some embodiments, the active flow-control device is configured to inject a flow-control fluid stream into the boundary layer through an injection orifice that is defined by the bullnose fairing. In some embodiments, the injection orifice forms a portion of a sweeping jet. In some embodiments, a flow rate of the flow-control fluid stream through the injection orifice is at least 100 m/s and less than 700 m/s. In some embodiments, a pressure differential of the flow-control fluid stream across the injection orifice is at least 20 kPa. In some embodiments, the flow-control fluid stream includes a compressed gas stream that is generated by the jet engine and/or a synthetic jet that is generated by a synthetic jet generator.

In some embodiments, the active flow-control device is configured to inject a plurality of flow-control fluid streams into the boundary layer. In some embodiments, the active flow-control device is configured to systematically vary which of the plurality of flow-control fluid streams is being injected into the boundary layer at a given point in time. In some embodiments, the plurality of flow-control fluid streams is injected via a plurality of injection orifices that is defined within the bullnose fairing. In some embodiments, the plurality of injection orifices is spaced-apart around a circumference of the bullnose fairing.

In some embodiments, the active flow-control device includes a vortex generator that is configured to generate a vortex within the boundary layer. In some embodiments, the active flow-control device includes a suction assembly that is configured to remove a suction stream from the boundary layer.

In some embodiments, the systems include a jet engine that includes the thrust-reverser assembly. In some embodiments, the systems include an aircraft that includes the jet engine.

The methods include flowing a thrust-reverser fluid stream through the reverser duct to generate the boundary layer. The methods further include energizing the boundary layer fluid flow with the active flow-control device to resist separation of the boundary layer from the bullnose fairing.

DESCRIPTION

Figure 1:
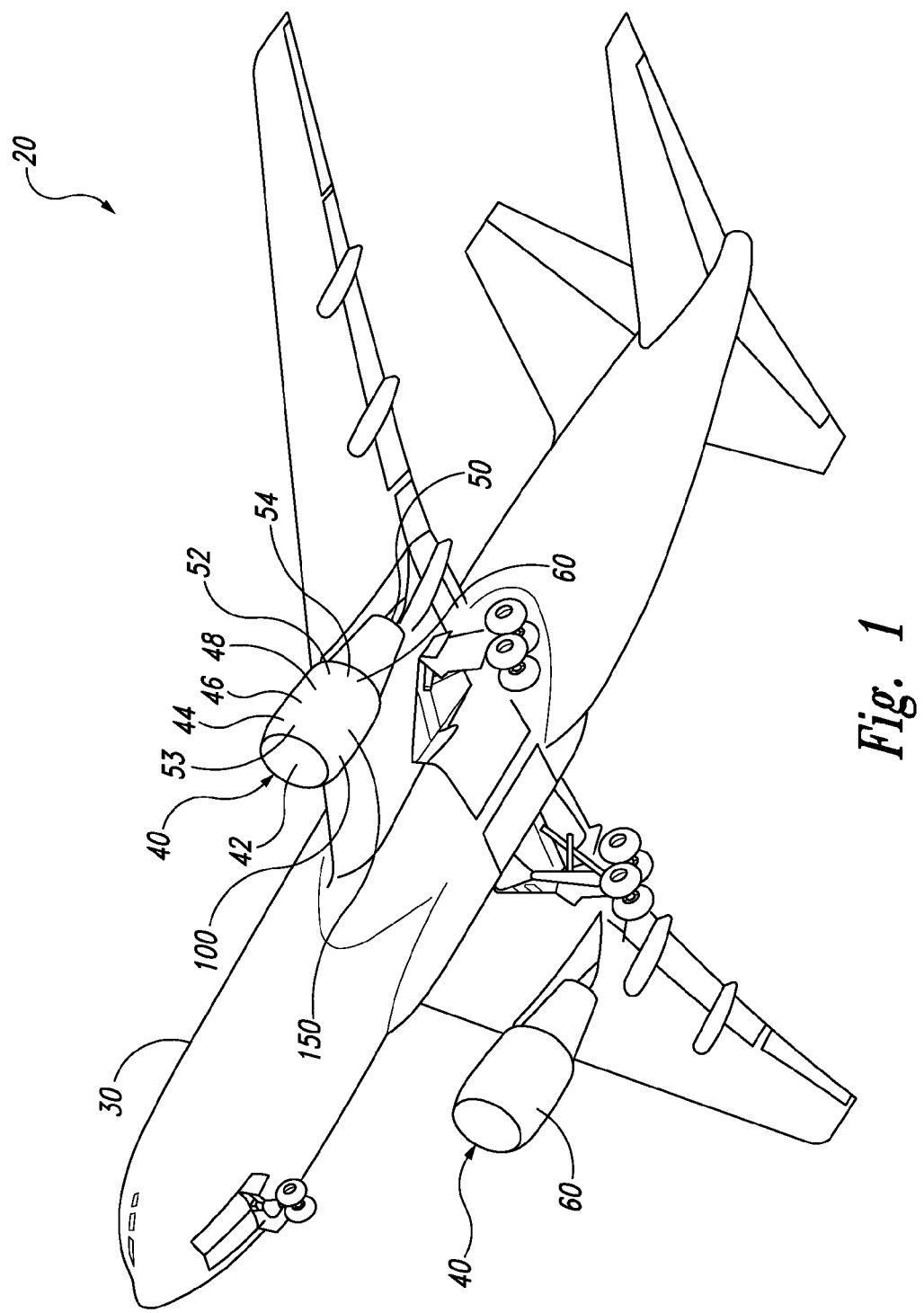
FIG. 1 is a schematic representation of an illustrative, non-exclusive example of an aircraft that may include a jet engine that includes a thrust-reverser assembly according to the present disclosure.

FIGS. 1-9 provide illustrative, non-exclusive examples of bullnose fairings 100 that include active flow-control devices 150 according to the present disclosure, of thrust-reverser assemblies 60 that include bullnose fairings 100, of jet engines 40 that include thrust-reverser assemblies 60, of aircraft 20 that include jet engines 40, and/or of methods of operating the same. Elements that serve a similar, or at least substantially similar, purpose are labeled with like numbers in each of FIGS. 1-9, and these elements may not be discussed in detail herein with reference to each of FIGS. 1-9. Similarly, all elements may not be labeled in each of FIGS. 1-9, but reference numerals associated therewith may be utilized herein for consistency. Elements, components, and/or features that are discussed herein with reference to one or more of FIGS. 1-9 may be included in and/or utilized with any of FIGS. 1-9 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

Figure 2:
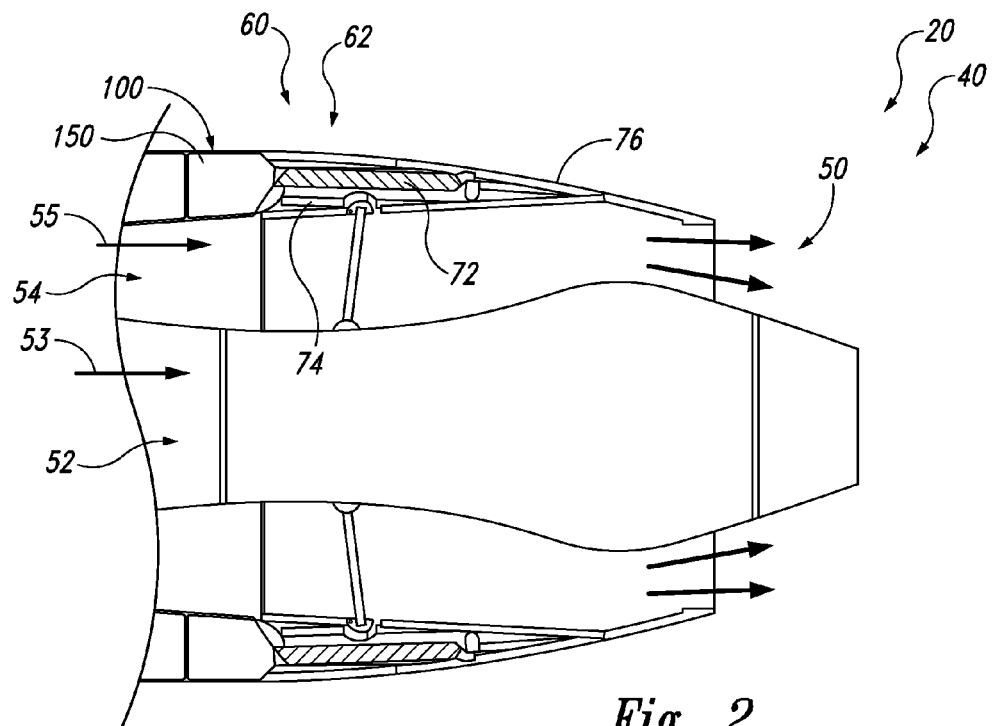
FIG. 2 is a schematic representation of an illustrative, non-exclusive example of a jet engine that includes a thrust-reverser assembly according to the present disclosure in a forward-thrust configuration.
Figure 3:
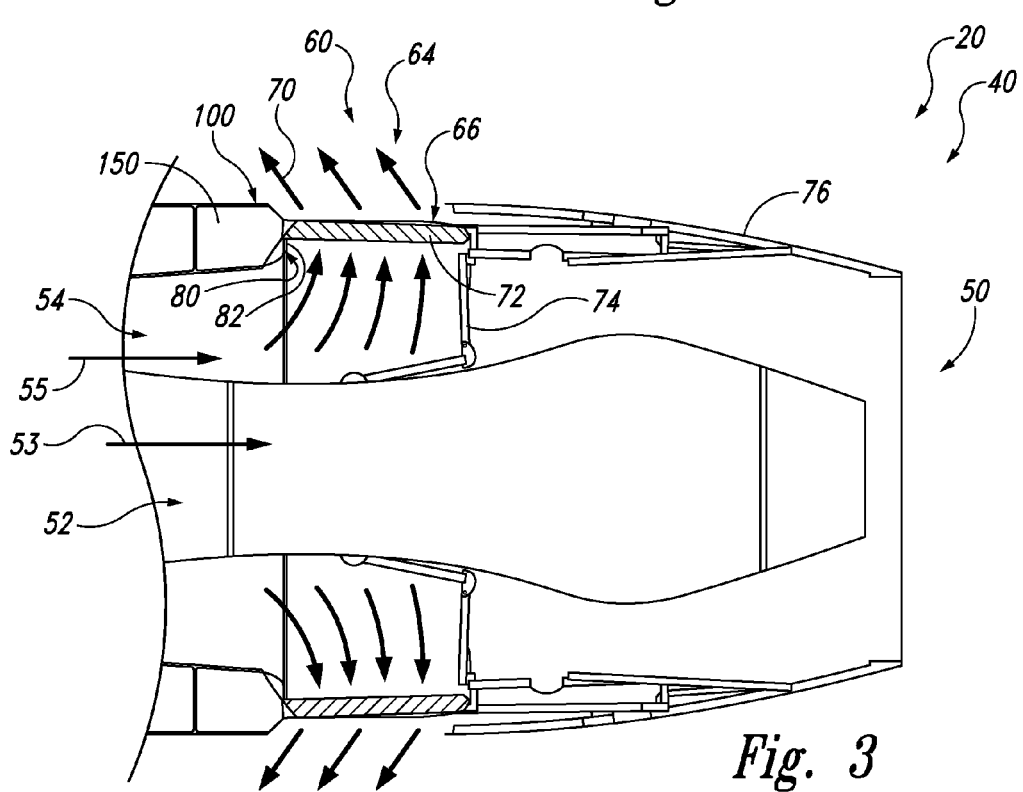
FIG. 3 is a schematic representation of an illustrative, non-exclusive example of a jet engine that includes a thrust-reverser assembly according to the present disclosure in a reverse-thrust configuration.

FIG. 1 is a schematic representation of an illustrative, non-exclusive example of an aircraft 20 that may include a jet engine 40 that includes a thrust-reverser assembly 60 according to the present disclosure, while FIGS. 2-3 are more detailed but still illustrative, non-exclusive examples of a jet engine 40 that includes a thrust-reverser assembly 60 according to the present disclosure. As illustrated in FIG. 1, aircraft 20 includes an airframe 30, which is operatively attached to and/or configured to support one or more jet engines 40. As further illustrated in FIG. 1, jet engines 40 may include an inlet 42, which is configured to receive an air stream, and a compressor 44, which is configured to compress (or increase a pressure of) the air stream. Jet engines 40 also may include a burner 46, which is configured to combust a fuel stream with a portion 53 of the air stream to generate a combustion stream, and a turbine 48, which is configured to be powered by the combustion stream and to power compressor 44.

As illustrated in FIGS. 1-3, jet engines 40 further may include a nozzle 50, which is configured to permit the combustion stream and the portion of the air stream to be expelled from (or to exit) jet engine 40. As illustrated most clearly in FIGS. 2-3, jet engines 40 may define a central duct 52, which is configured to receive portion 53 of the air stream from inlet 42, and a bypass duct 54, which is configured to receive another portion of the air stream, which is referred to herein as a bypass stream 55, from inlet 42.

Thrust-reverser assembly 60 includes a bullnose fairing 100 that includes an active flow-control device 150. Thrust-reverser assembly 60 may define a forward-thrust configuration 62 (as illustrated in FIG. 2) and a reverse-thrust configuration 64 (as illustrated in FIG. 3). When thrust-reverser assembly 60 is in forward-thrust configuration 62, bypass stream 55 may flow through bypass duct 54 and exit jet engine 40 via nozzle 50, thereby contributing to the forward-thrust that is generated by the jet engine. Alternatively, when thrust-reverser assembly 60 is in reverse-thrust configuration 64, bypass stream 55 may exit jet engine 40 via a reverser duct 66 as a thrust-reverser fluid flow 70, thereby generating a reverse-thrust that is at least substantially opposed to the forward-thrust.

Thrust-reverser assembly 60 further may include a vane grid 72. Vane grid 72 may extend across reverser duct 66 and may be configured to regulate flow of the bypass stream through the reverser duct (i.e., as thrust-reverser fluid flow 70). Thrust-reverser assembly 60 also may include a blocker door 74 and/or an outer housing 76. Blocker door 74 and outer housing 76 may operate cooperatively to transition thrust-reverser assembly 60 between forward-thrust configuration 62 and reverse-thrust configuration 64. As an illustrative, non-exclusive example, outer housing 76 may translate along a length of jet engine 40 to selectively permit and restrict flow of bypass stream 55 through reverser duct 66. As another illustrative, non-exclusive example, blocker door 74 may selectively permit and restrict fluid flow through a portion of bypass duct 54 that is located downstream from reverser duct 66, thereby selectively directing bypass stream 55 through reverser duct 66 as thrust-reverser fluid flow 70.

As discussed in more detail herein, and when thrust-reverser assembly 60 is in reverse-thrust configuration 64, active flow-control device 150 may be configured, utilized, and/or operated to resist separation of a boundary layer 80, which includes a boundary layer fluid flow 82, from bullnose fairing 100. As an illustrative, non-exclusive example, active flow-control device 150 may be configured to energize boundary layer fluid flow 82, thereby changing one or more characteristics of boundary layer fluid flow 82 and permitting boundary layer fluid flow 82 to flow past bullnose fairing 100 without separation therefrom.

In general, thrust-reverser assemblies 60 according to the present disclosure that include active flow-control device 150 may be configured to retain boundary layer 80 attached to bullnose fairing 100 over a wide range of average thrust-reverser fluid flow speeds of thrust-reverser fluid flow 70. As illustrative, non-exclusive examples, thrust-reverser assemblies 60 according to the present disclosure may maintain boundary layer 80 attached to bullnose fairing 100 when the average thrust-reverser fluid flow speed is at least 100 meters/second (m/s), at least 125 m/s, at least 150 m/s, at least 175 m/s, at least 200 m/s, at least 225 m/s, at least 250 m/s, at least 275 m/s, and/or at least 300 m/s. Additionally or alternatively, thrust-reverser assemblies 60 also may maintain boundary layer 80 attached to bullnose fairing 100 when the average thrust-reverser fluid flow speed is less than 350 m/s, less than 325 m/s, less than 300 m/s, less than 275 m/s, less than 250 m/s, less than 225 m/s, and/or less than 200 m/s.

Active flow-control device 150 may include and/or utilize any suitable active flow-control technology. As an illustrative, non-exclusive example, and as discussed in more detail herein, active flow-control device 150 may be configured to inject a flow-control fluid stream into boundary layer 80. As another illustrative, non-exclusive example, active flow-control device 150 may include a vortex generator that is configured to generate a vortex within boundary layer 80. As yet another illustrative, non-exclusive example, active flow-control device 150 may be configured to remove a suction stream from boundary layer 80.

It is within the scope of the present disclosure that active flow-control device 150 may supply the flow-control fluid stream, may generate the vortex, and/or may remove the suction stream in any suitable manner and/or utilizing any suitable equipment. As illustrative, non-exclusive examples, active flow-control device 150 may include one or more of a piezoelectric actuator, a shape memory alloy actuator, a diaphragm, a pump, a compressor, and/or a fan.

Figure 4:
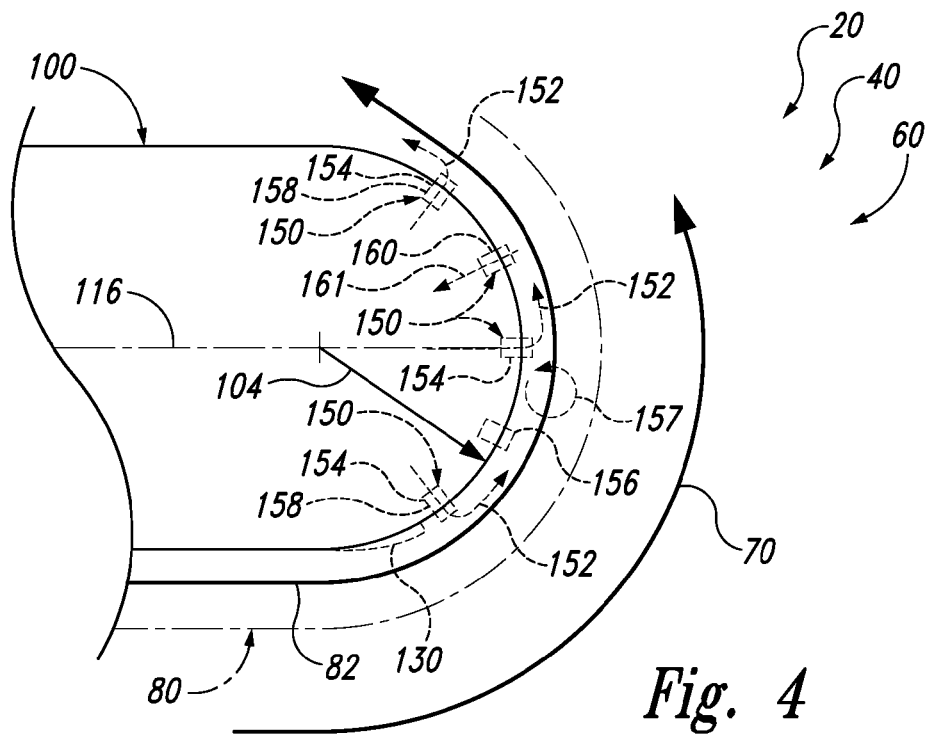
FIG. 4 is a schematic cross-sectional view of a bullnose fairing that includes an active flow-control device according to the present disclosure.

FIG. 4 is a schematic cross-sectional view of a bullnose fairing 100 that includes an active flow-control device 150 according to the present disclosure. As discussed, active flow-control device 150 may be configured to interact with, modify, and/or energize a boundary layer fluid flow 82 that is present within a boundary layer 80 of a thrust-reverser fluid flow 70 that is flowing past bullnose fairing 100 to resist separation of the boundary layer from the bullnose fairing. This may be accomplished in any suitable manner.

As an illustrative, non-exclusive example, active flow-control device 150 may be configured to inject one or more flow-control fluid streams 152 into boundary layer 80 through an injection orifice 154 that may be defined by, within, and/or on bullnose fairing 100. Flow-control fluid stream 152 may be injected into boundary layer 80 in any suitable manner. As an illustrative, non-exclusive example, flow-control fluid stream 152 may be injected at a flow speed, or average flow speed, of at least 100 meters/second (m/s), at least 125 m/s, at least 150 m/s, at least 175 m/s, at least 200 m/s, at least 225 m/s, at least 250 m/s, at least 275 m/s, at least 300 m/s, at least 350 m/s, at least 400 m/s, at least 450 m/s, or at least 500 m/s. As another illustrative, non-exclusive example, flow-control fluid stream 152 may be injected at a flow speed of less than 700 m/s, less than 650 m/s, less than 600 m/s, less than 550 m/s, less than 500 m/s, less than 450 m/s, less than 400 m/s, less than 350 m/s, less than 325 m/s, less than 300 m/s, less than 275 m/s, less than 250 m/s, less than 225 m/s, and/or less than 200 m/s. As yet another illustrative, non-exclusive example, flow-control fluid stream 152 may be injected through injection orifice 154 such that a pressure differential across the injection orifice is at least 1 kilopascal (kPa), at least 5 kPa, at least 10 kPa, at least 15 kPa, at least 20 kPa, at least 25 kPa, at least 30 kPa, at least 35 kPa, and/or at least 40 kPa.

It is within the scope of the present disclosure that active flow-control device 150 may be configured to continuously, or at least substantially continuously, inject flow-control fluid stream 152 into boundary layer 80 when thrust-reverser fluid flow 70 is flowing past bullnose fairing 100 and/or when thrust-reverser assembly 60 is in the reverse-thrust configuration (as illustrated in FIG. 3). Additionally or alternatively, it is also within the scope of the present disclosure that active flow-control device 150 may be configured to intermittently, selectively, and/or periodically inject flow-control fluid stream 152 into boundary layer 80 when thrust-reverser fluid flow 70 is flowing past bullnose fairing 100 and/or when thrust-reverser assembly 60 is in the reverse-thrust configuration.

Flow-control fluid stream 152 may be injected into boundary layer 80 at any suitable location. As an illustrative, non-exclusive example, flow-control fluid stream 152 may be injected into boundary layer 80 at a cordwise location 116 along a length of bullnose fairing 100. As another illustrative, non-exclusive example, flow-control fluid stream 152 may be injected into boundary layer 80 at a location that is offset (i.e., upstream and/or downstream) from cordwise location 116. As yet another illustrative, non-exclusive example, active flow-control device 150 may be configured to inject a plurality of flow-control fluid streams 152 into boundary layer 80. This may include injecting the plurality of flow-control fluid streams in a spaced-apart manner around a curvature, or radius of curvature, 104 of bullnose fairing 100.

As yet another illustrative, non-exclusive example, flow-control fluid stream 152 may be injected behind, downstream of, and/or on a lee side of a step 130 on a surface of bullnose fairing 100. Step 130 may include and/or be any suitable discontinuity and/or change in profile of bullnose fairing 100 and also may be referred to herein as a discontinuity 130.

Flow-control fluid stream 152 may be generated in any suitable manner. As an illustrative, non-exclusive example, flow-control fluid stream 152 may include and/or be a compressed gas stream that is generated by jet engine 40 and/or by compressor 44 thereof (as illustrated in FIG. 1). Additionally or alternatively, flow-control fluid stream 152 may include and/or be a synthetic jet that is generated by a synthetic jet generator 158.

As another illustrative, non-exclusive example, active flow-control device 150 may include a suction assembly 160 that is configured to withdraw a suction stream 161 from boundary layer 80. As yet another illustrative, non-exclusive example, active flow-control device 150 may include a vortex generator 156 that is configured to generate a vortex 157 within boundary layer 80. Vortex generator 156 may include any suitable active and/or passive vortex generator 156 that is configured to generate vortex 157 in any suitable manner. As illustrative, non-exclusive examples, vortex generator 156 may include a physical obstruction and/or a vortex generator jet actuator.

Figure 5:
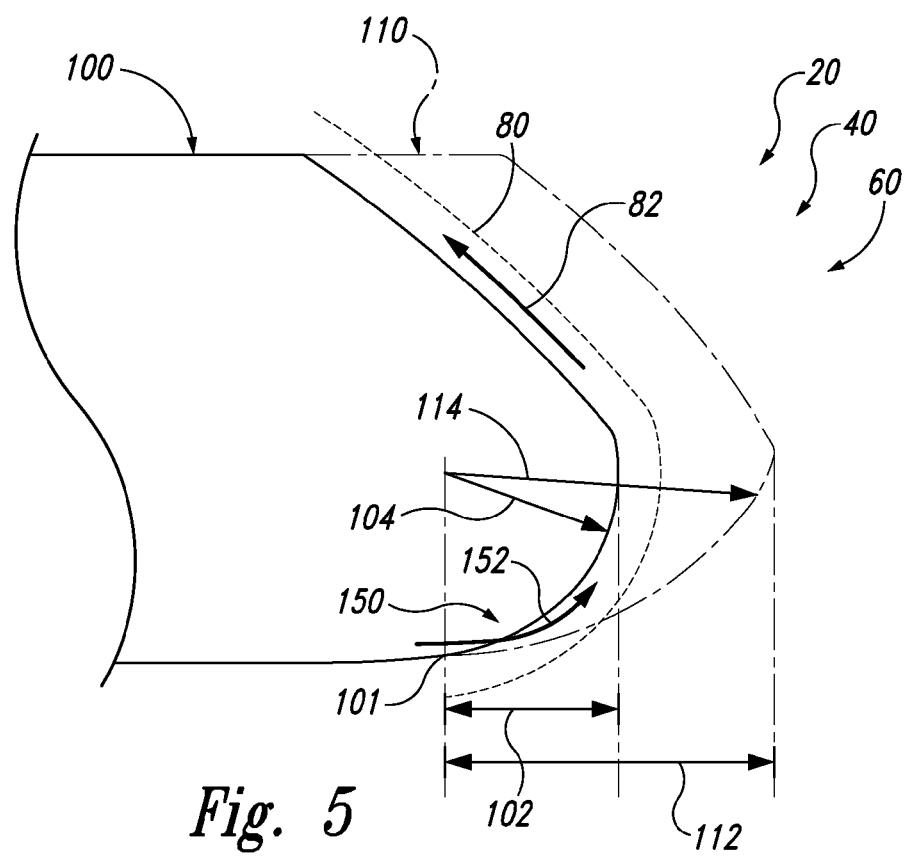
FIG. 5 is a schematic cross-sectional view comparing a conventional bullnose fairing to a bullnose fairing that includes an active flow-control device according to the present disclosure.

FIG. 5 is a schematic cross-sectional view comparing a conventional bullnose fairing 110 to a bullnose fairing 100 according to the present disclosure that includes an active flow-control device 150. Bullnose fairings 100 according to the present disclosure that include active flow-control devices 150 may provide improved performance over conventional bullnose fairings 110 that do not include active flow-control devices 150.

As an illustrative, non-exclusive example, a boundary layer fluid flow 82 within boundary layer 80 that is adjacent bullnose fairing 100 may define a threshold mass flow rate below which boundary layer 80 is attached to bullnose fairing 100 and above which boundary layer 80 detaches and/or separates from bullnose fairing 100. Similarly, a boundary layer fluid flow within a boundary layer that is attached to conventional bullnose fairing 110 also may define a threshold mass flow rate below which the boundary layer is attached to bullnose fairing 110 and above which the boundary layer detaches and/or separates from bullnose fairing 100. However, the presence of active flow-control devices 150 in bullnose fairings 100 according to the present disclosure, may permit bullnose fairings 100 to have a comparable, or even greater, threshold mass flow rate despite having a shorter length 102 than a conventional length 112 of conventional bullnose fairing 100 and/or despite defining a smaller radius of curvature 104 when compared to a conventional radius of curvature 114 of conventional bullnose fairing 110. The lengths may be defined relative to a starting point 101 at which a profile of the bullnose fairing changes in order to direct and/or bend boundary layer fluid flow 82. Similarly, the radii of curvature may approximate and/or be a radius of curvature traveled by at least a portion of boundary layer fluid flow 82 as boundary layer fluid flow 82 flows around bullnose fairing 100/110.

As illustrative, non-exclusive examples, length 102 may be less than 90%, less than 80%, less than 70%, less than 60%, less than 50%, and/or less than 40% of conventional length 112. Additionally or alternatively, radius of curvature 104 may be less than 90%, less than 80%, less than 70%, less than 60%, less than 50%, and/or less than 40% of conventional radius of curvature 114.

Decreasing length 102 and/or radius of curvature 104 relative to conventional length 112 and/or conventional radius of curvature 114 may provide significant performance benefits within jet engines 40 that include thrust-reverser assemblies 60 according to the present disclosure. As an illustrative, non-exclusive example, decreasing length 102 and/or radius of curvature 104 may permit bypass duct 54 to have a larger cross-sectional area without increasing an overall outer size of jet engine 40. This may permit jet engines 40 that include thrust-reverser assemblies 60 to have a greater bypass ratio (i.e., a ratio of a flow rate of bypass stream 55 to a flow rate of portion of the air stream 53 that flows through central duct 52) than jet engines that include conventional thrust-reverser assemblies. Illustrative, non-exclusive examples of bypass ratios that may be utilized with jet engines 40 according to the present disclosure include bypass ratios of at least 5, at least 10, at least 15, at least 20, and/or at least 25. Additionally or alternatively, the bypass ratio may be less than 40, less than 35, less than 30, less than 25, and/or less than 20. Stated another way, the bypass ratio of jet engines 40 according to the present disclosure may be at least 105%, at least 110%, at least 115%, at least 120%, at least 125%, and/or at least 130% larger than conventional jet engines that define the same, or a similar, overall outer size.

Jet engines 40 according to the present disclosure also may exhibit less weight and/or a smaller overall outer size when compared to comparable conventional jet engines due to the smaller length 102 and/or radius of curvature 104 of bullnose fairing 100. This may decrease nacelle friction loss with jet engines 40, increasing fuel economy. Additionally or alternatively, this also may provide for increased flexibility regarding location(s) where jet engines 40 may be mounted on aircraft 20.

Figure 6:
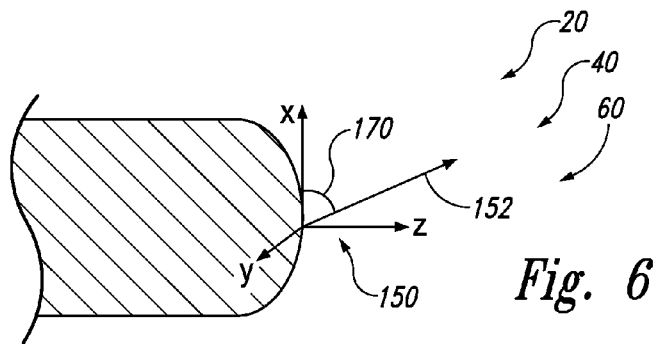
FIG. 6 is a schematic cross-sectional view of a bullnose fairing that includes an active flow-control device according to the present disclosure illustrating a first injection angle of a flow-control fluid stream.
Figure 7:
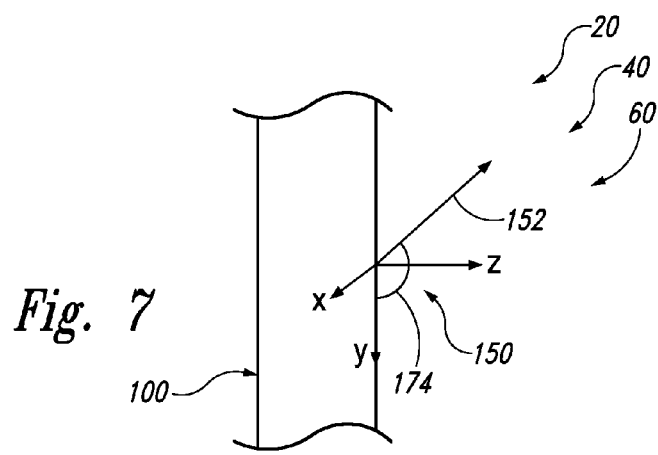
FIG. 7 is a schematic top view of the bullnose fairing of FIG. 6 illustrating a second injection angle of the flow-control fluid stream.
Figure 8:
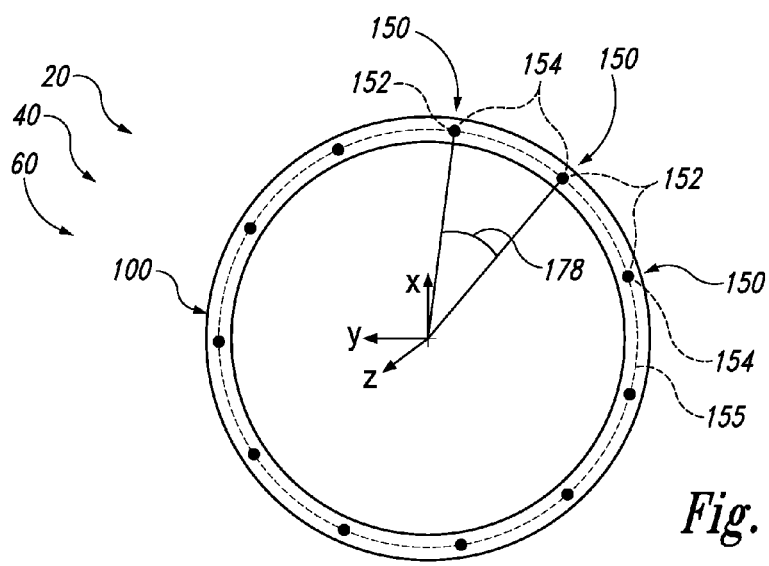
FIG. 8 is a schematic rear view of the bullnose fairing of FIGS. 6-7 illustrating a distribution of active flow-control devices around a circumference of the bullnose fairing.

FIGS. 6-8 provide various views of a bullnose fairing 100 that includes an active flow-control device 150 according to the present disclosure. FIGS. 6-8 illustrate various orientations and/or locations for active flow-control devices 150 and/or various relative orientations for a flow-control fluid stream 152 that may be provided by active flow-control devices 150. For consistency of reference, a single Cartesian coordinate system has been utilized to describe the relative orientations of active flow-control devices 150 and/or flow-control fluid streams 152 thereof among FIGS. 6-8; however, this specific coordinate system is not required, and Cartesian coordinate systems that are oriented differently than illustrated in FIGS. 6-8, as well as other coordinate systems, are within the scope of the present disclosure.

FIG. 6 is a schematic cross-sectional view of bullnose fairing 100 and illustrates a first injection angle 170 of flow-control fluid stream 152. In the illustrative, non-exclusive example of FIG. 6, first injection angle 170 is measured in a first plane (i.e., the X-Z plane) that is parallel to a surface normal direction (i.e., the Z-direction) of bullnose fairing 100. It is within the scope of the present disclosure that the first injection angle 170 may include any suitable angle.

FIG. 7 is a schematic top view of bullnose fairing 100 of FIG. 6 illustrating a second injection angle 174 of flow-control fluid stream 152. In the illustrative, non-exclusive example of FIG. 7, second injection angle 174 is measured in a second plane (i.e., the Y-Z plane) that is parallel to the surface normal direction and that is perpendicular to the first plane. It is within the scope of the present disclosure that second injection angle 174 may include any suitable angle.

Illustrative, non-exclusive examples of first injection angle 170 and/or second injection angle 174 include angles of at least 0 degrees, at least 5 degrees, at least 10 degrees, at least 15 degrees, at least 20 degrees, at least 30 degrees, at least 40 degrees, at least 50 degrees, at least 60 degrees, at least 70 degrees, at least 80 degrees, at least 90 degrees, at least 100 degrees, at least 110 degrees, at least 120 degrees, at least 130 degrees, at least 140 degrees, at least 150 degrees, at least 160 degrees, and/or at least 170 degrees. As additional illustrative, non-exclusive examples, first injection angle 170 and/or second injection angle 174 include angles of less than 180 degrees, less than 170 degrees, less than 160 degrees, less than 150 degrees, less than 140 degrees, less than 130 degrees, less than 120 degrees, less than 110 degrees, less than 100 degrees, less than 90 degrees, less than 80 degrees, less than 70 degrees, less than 60 degrees, less than 50 degrees, less than 40 degrees, less than 30 degrees, less than 20 degrees, less than 15 degrees, less than 10 degrees, and/or less than 5 degrees.

It is within the scope of the present disclosure that first injection angle 170 and/or second injection angle 174 may be a variable angle that varies between any of the above-listed lower limits and any of the above-listed upper limits. Under these conditions, flow-control fluid stream 152 may be generated by a sweeping jet that systematically and/or periodically varies the first injection angle and/or the second injection angle.

FIG. 8 is a schematic rear view of the bullnose fairing of FIGS. 6-7 illustrating a distribution, location, and/or spacing of active flow-control devices 150 around a circumference of bullnose fairing 100. As illustrated in FIG. 8, bullnose fairings 100 may include a plurality of active flow-control devices 150, may include a plurality of injection orifices 154, and/or may be configured to inject a plurality of flow-control fluid streams 152.

It is within the scope of the present disclosure that the plurality of active flow-control devices 150 may define any suitable relative orientation on bullnose fairing 100. As an illustrative, non-exclusive example, each of the plurality of active flow-control devices 150 may define an angular spacing 178 relative to an adjacent active flow-control device 150. Illustrative, non-exclusive examples of the angular spacing include angles of at least 1 degree, at least 2 degrees, at least 3 degrees, at least 4 degrees, at least 5 degrees, and/or at least 10 degrees. Additional illustrative, non-exclusive examples of the angular spacing include angles of less than 90 degrees, less than 45 degrees, less than 40 degrees, less than 30 degrees, less than 20 degrees, less than 15 degrees, less than 10 degrees, and/or less than 5 degrees.

The plurality of active flow-control devices may include any suitable number of active flow-control devices. As illustrative, non-exclusive examples, bullnose fairing 100 may include at least 4, at least 8, at least 9, at least 12, at least 18, at least 24, at least 36, at least 72, at least 90, at least 120, at least 180, at least 270, and/or at least 360 active flow-control devices 150 and/or injection orifices 154, or may be configured to inject a corresponding number of flow-control fluid streams 152. As additional illustrative, non-exclusive examples, bullnose fairing 100 may include fewer than 36, fewer than 72, fewer than 90, fewer than 120, fewer than 180, fewer than 270, fewer than 360, and/or fewer than 720 active flow-control devices 150 and/or injection orifices 154, or may be configured to inject a corresponding number of flow-control fluid streams 152.

When bullnose fairing 100 includes a plurality of active flow-control devices 150 and/or is configured to inject a plurality of flow-control fluid streams 152, the plurality of flow-control fluid streams 152 may be injected in any suitable manner. As an illustrative, non-exclusive example, each of the plurality of flow-control fluid streams may be injected continuously when a thrust-reverser assembly 60 that includes bullnose fairing 100 is in the reverse-thrust configuration (as illustrated in FIG. 3) and/or when thrust-reverser fluid flow 70 is flowing past bullnose fairing 100. As another illustrative, non-exclusive example, one or more of the flow-control fluid streams 152 may be injected intermittently. This may include systematically varying which of the plurality of flow-control fluid streams 152 is being injected at a given point in time.

When active flow-control device 150 is configured to inject the plurality of flow-control fluid streams 152, the plurality of flow-control fluid streams may be injected through the plurality of injection orifices 154, which may be defined by bullnose fairing 100. It is within the scope of the present disclosure that the plurality of injection orifices 154 may include any suitable cross-sectional shape, including circular, elongate, slotted, square, arcuate, and/or rectangular cross-sectional shapes, and that at least a portion of the plurality of injection orifices 154 may have a different cross-sectional shape and/or size relative to a remainder of the plurality of injection orifices 154. It is also within the scope of the present disclosure that active flow-control device 150 may include a continuous, or at least substantially continuous, slot 155 that may be configured to inject one or more flow-control fluid streams around at least a portion, or even all, of a circumference of bullnose fairing 100.

Figure 9:
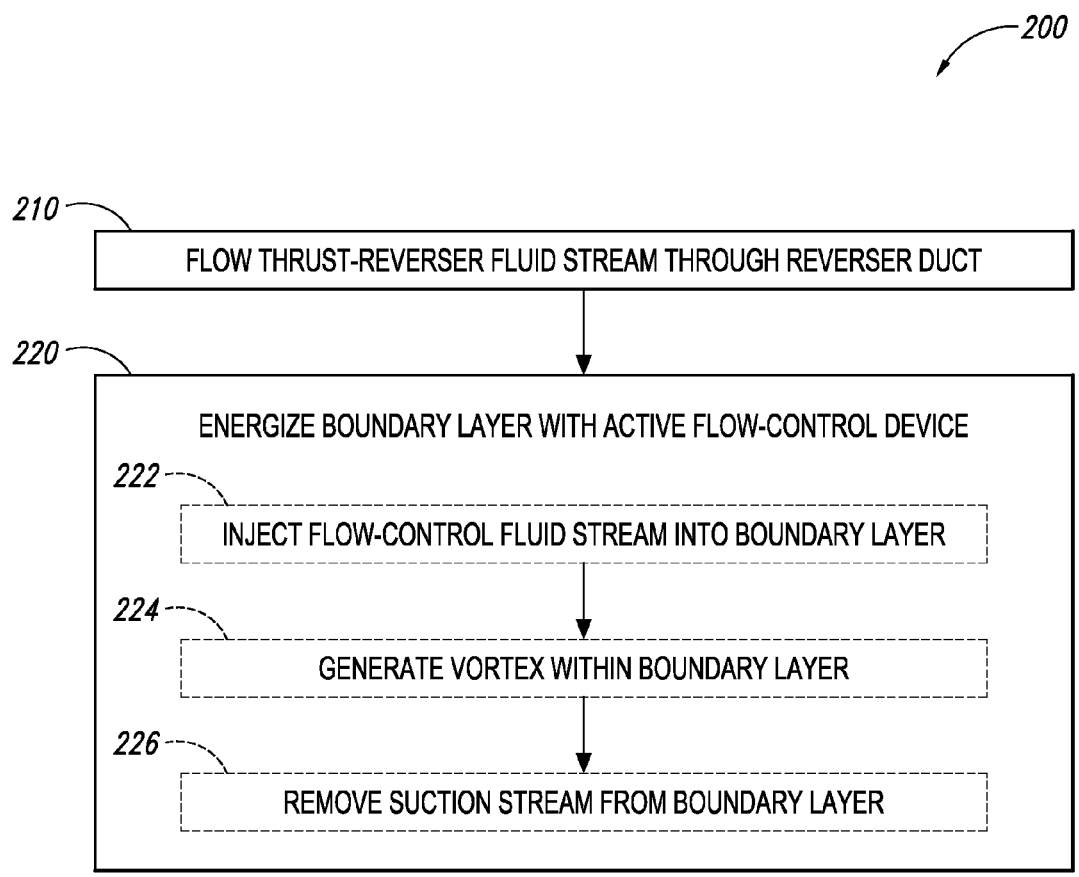
FIG. 9 is a flowchart depicting methods, according to the present disclosure, of resisting boundary layer separation from a bullnose fairing of a thrust-reverser assembly.

FIG. 9 is a flowchart depicting methods 200, according to the present disclosure, of resisting boundary layer separation from a bullnose fairing of a thrust-reverser assembly. Methods 200 include flowing a thrust-reverser fluid stream through a reverser duct of a jet engine at 210 and energizing a boundary layer with an active flow-control device at 220.

Flowing the thrust-reverser fluid stream through the reverser duct at 210 may include flowing through any suitable reverser duct that forms a portion of the thrust-reverser assembly. The flowing at 210 may include generating a boundary layer, which includes a boundary layer fluid flow, adjacent the bullnose fairing.

Energizing the boundary layer at 220 may include energizing to resist separation of the boundary layer from the bullnose fairing. This may include modifying any suitable characteristic, or flow characteristic, of the boundary layer and/or of the boundary layer fluid flow to decrease a potential for separation of the boundary layer from the bullnose fairing, such as under expected and/or nominal operating conditions of the jet engine. As an illustrative, non-exclusive example, the energizing at 220 may include energizing to resist separation of the boundary layer from the bullnose fairing when an average flow speed of the thrust-reverser fluid stream is at least 100 meters/second (m/s), at least 125 m/s, at least 150 m/s, at least 175 m/s, at least 200 m/s, at least 225 m/s, at least 250 m/s, at least 275 m/s, and/or at least 300 m/s. Additionally or alternatively, the energizing also may include energizing to resist separation of the boundary layer from the bullnose fairing when the average speed of the thrust-reverser fluid stream is less than 350 m/s, less than 325 m/s, less than 300 m/s, less than 275 m/s, less than 250 m/s, less than 225 m/s, and/or less than 200 m/s.

The energizing at 220 may be accomplished in any suitable manner. As illustrative, non-exclusive examples, the energizing at 220 may include injecting a flow-control fluid stream into the boundary layer at 222, generating a vortex within the boundary layer at 224, and/or removing a suction stream from the boundary layer at 226.

Injecting the flow-control fluid stream into the boundary layer at 222 may include injecting the flow-control fluid stream through an injection orifice that is defined by the bullnose fairing. The injecting at 222 may include injecting at any suitable flow speed of the flow-control fluid stream, illustrative, non-exclusive examples of which are disclosed herein. Additionally or alternatively, the injecting at 222 also may include injecting such that any suitable pressure differential, illustrative, non-exclusive examples of which are disclosed herein, is developed across the injection orifice.

The injecting at 222 may include continuously, or at least substantially continuously injecting the flow-control fluid stream during the flowing at 210. Alternatively, the injecting at 222 also may include intermittently injecting the flow-control fluid stream during the flowing at 210.

It is within the scope of the present disclosure that the injecting at 222 may include injecting at a first injection angle and/or injecting at a second injection angle. Illustrative, non-exclusive examples of the first injection angle and the second injection angle are disclosed herein.

The flow-control fluid stream may be generated in any suitable manner. As an illustrative, non-exclusive example, the injecting at 222 may include directing a compressed gas stream through the injection orifice. The compressed gas stream may be generated in any suitable manner, such as by the jet engine and/or via any suitable pump and/or compressor. As another illustrative, non-exclusive example, the injecting at 222 may include generating the flow-control fluid stream with a synthetic jet generator.

The injecting at 222 may include injecting a single flow-control fluid stream or a plurality of flow-control fluid streams. When the injecting at 222 includes injecting the plurality of flow-control fluid streams, the injecting at 222 further may include systematically and/or periodically varying which of the plurality of flow-control fluid streams is being injected into the boundary layer at a given point in time. Additionally or alternatively, and as discussed, the plurality of flow-control fluid streams may be injected in a spaced-apart manner around a circumference of the bullnose fairing. Illustrative, non-exclusive examples of a spacing among the plurality of flow-control fluid streams and/or of a number of flow-control fluid streams (and/or corresponding injection orifices) in the plurality of flow-control fluid streams are discussed herein.

Generating the vortex within the boundary layer at 224 may include generating the vortex in any suitable manner. As an illustrative, non-exclusive example, the generating at 224 may include generating with a vortex generator.

Removing the suction stream from the boundary layer at 226 may include removing the suction fluid stream from the boundary layer in any suitable manner. As an illustrative, non-exclusive example, the removing at 226 may include generating a vacuum within a suction assembly to remove the suction fluid stream from the boundary layer.

Illustrative, non-exclusive examples of inventive subject matter according to the present disclosure are described in the following enumerated paragraphs:

A1. A thrust-reverser assembly for a jet engine, wherein the thrust-reverser assembly defines a forward-thrust configuration and a reverse-thrust configuration, the assembly comprising:

a bullnose fairing that defines a portion of a reverser duct; and an active flow-control device located to energize a boundary layer fluid flow within a boundary layer adjacent to the bullnose fairing to resist separation of the boundary layer from the bullnose fairing when the thrust-reverser assembly is in the reverse-thrust configuration.

A2. The assembly of paragraph A1, wherein the boundary layer fluid flow defines a threshold mass flow rate below which the boundary layer is attached to the bullnose fairing, and further wherein a radius of curvature of the bullnose fairing is less than a conventional radius of curvature of a conventional bullnose fairing that produces a comparable threshold mass flow rate but that does not include the active flow-control device.

A2.1 The assembly of paragraph A2, wherein the radius of curvature of the bullnose fairing is less than 90%, less than 80%, less than 70%, less than 60%, less than 50%, or less than 40% of the conventional radius of curvature of the conventional bullnose fairing.

A3. The assembly of any of paragraphs A1-A2.1, wherein the boundary layer defines a/the threshold mass flow rate below which the boundary layer is attached to the bullnose fairing, and further wherein a length of the bullnose fairing is less than a conventional length of a/the conventional bullnose fairing that produces a/the comparable threshold mass flow rate but that does not include the active flow-control device.

A3.1 The assembly of paragraph A3, wherein the length of the bullnose fairing is less than 90% less than 80%, less than 70%, less than 60%, less than 50%, or less than 40% of the conventional length of the conventional bullnose fairing.

A4. The assembly of any of paragraphs A1-A3.1, wherein the assembly includes the boundary layer.

A5. The assembly of any of paragraphs A1-A4, wherein the assembly includes the boundary layer fluid flow.

A6. The assembly of any of paragraphs A1-A5, wherein, when the thrust-reverser assembly is in the reverse-thrust configuration, the active flow-control device is configured to resist separation of the boundary layer from the bullnose fairing when an average thrust-reverser fluid flow speed through the reverser duct is at least one of:

(i) at least 100 meters/second (m/s), at least 125 m/s, at least 150 m/s, at least 175 m/s, at least 200 m/s, at least 225 m/s, at least 250 m/s, at least 275 m/s, or at least 300 m/s; and (ii) less than 350 m/s, less than 325 m/s, less than 300 m/s, less than 275 m/s, less than 250 m/s, less than 225 m/s, or less than 200 m/s.

A7. The assembly of any of paragraphs A1-A6, wherein the active flow-control device is configured to inject a flow-control fluid stream into the boundary layer through an injection orifice that is defined by the bullnose fairing.

A7.1 The assembly of paragraph A7, wherein the injection orifice forms a portion of a sweeping jet.

A7.2 The assembly of any of paragraphs A7-A7.1, wherein the assembly includes the flow-control fluid stream.

A7.3 The assembly of any of paragraphs A7-A7.2, wherein a flow speed of the flow-control fluid stream through the injection orifice is at least one of:

(i) at least 100 meters/second (m/s), at least 125 m/s, at least 150 m/s, at least 175 m/s, at least 200 m/s, at least 225 m/s, at least 250 m/s, at least 275 m/s, at least 300 m/s, at least 350 m/s, at least 400 m/s, at least 450 m/s, or at least 500 m/s; and (ii) less than 700 m/s, less than 650 m/s, less than 600 m/s, less than 550 m/s, less than 500 m/s, less than 450 m/s, less than 400 m/s, less than 350 m/s, less than 325 m/s, less than 300 m/s, less than 275 m/s, less than 250 m/s, less than 225 m/s, or less than 200 m/s.

A7.4 The assembly of any of paragraphs A7-A7.3, wherein a pressure differential of the flow-control fluid stream across the injection orifice is at least 1 kilopascal (kPa), at least 5 kPa, at least 10 kPa, at least 15 kPa, at least 20 kPa, at least 25 kPa, at least 30 kPa, at least 35 kPa, or at least 40 kPa.

A7.5 The assembly of any of paragraphs A7-A7.4, wherein the active flow-control device is configured to continuously inject the flow-control fluid stream into the boundary layer when the thrust-reverser assembly is in the reverse-thrust configuration and the boundary layer fluid flow is present within the boundary layer.

A7.6 The assembly of any of paragraphs A7-A7.5, wherein the active flow-control device is configured to intermittently inject the flow-control fluid stream into the boundary layer when the thrust-reverser assembly is in the reverse-thrust configuration and the boundary layer fluid flow is present within the boundary layer.

A7.7 The assembly of any of paragraphs A7-A7.6, wherein the injection orifice includes at least one of a circular injection orifice, an elongate injection orifice, a slot, and a rectangular slot.

A7.8. The assembly of any of paragraphs A7-A7.7, wherein the injection orifice is a continuous slot that is defined around a circumference of the bullnose fairing.

A7.9 The assembly of any of paragraphs A7-A7.8, wherein the injection orifice is located on a cord of the bullnose fairing.

A7.10 The assembly of any of paragraphs A7-A7.9, wherein the active flow-control device is configured to inject the flow-control fluid stream into the boundary layer at a first injection angle as measured in a first plane that is parallel to a surface normal of the bullnose fairing and a second injection angle as measured in a second plane that is parallel to the surface normal direction and perpendicular to the first plane.

A7.10.1 The assembly of paragraph A7.10, wherein the first injection angle is at least one of:

(i) at least 0 degrees, at least 5 degrees, at least 10 degrees, at least 15 degrees, at least 20 degrees, at least 30 degrees, at least 40 degrees, at least 50 degrees, at least 60 degrees, at least 70 degrees, at least 80 degrees, at least 90 degrees, at least 100 degrees, at least 110 degrees, at least 120 degrees, at least 130 degrees, at least 140 degrees, at least 150 degrees, at least 160 degrees, or at least 170 degrees;

(ii) less than 180 degrees, less than 170 degrees, less than 160 degrees, less than 150 degrees, less than 140 degrees, less than 130 degrees, less than 120 degrees, less than 110 degrees, less than 100 degrees, less than 90 degrees, less than 80 degrees, less than 70 degrees, less than 60 degrees, less than 50 degrees, less than 40 degrees, less than 30 degrees, less than 20 degrees, less than 15 degrees, less than 10 degrees, or less than 5 degrees; and (iii) a variable first injection angle that varies between any one of (i) and any one of (ii).

A7.10.2 The assembly of any of paragraphs A7.10-A7.10.1, wherein the second injection angle is at least one of:

(i) at least 0 degrees, at least 5 degrees, at least 10 degrees, at least 15 degrees, at least 20 degrees, at least 30 degrees, at least 40 degrees, at least 50 degrees, at least 60 degrees, at least 70 degrees, at least 80 degrees, at least 90 degrees, at least 100 degrees, at least 110 degrees, at least 120 degrees, at least 130 degrees, at least 140 degrees, at least 150 degrees, at least 160 degrees, or at least 170 degrees;

(ii) less than 180 degrees, less than 170 degrees, less than 160 degrees, less than 150 degrees, less than 140 degrees, less than 130 degrees, less than 120 degrees, less than 110 degrees, less than 100 degrees, less than 90 degrees, less than 80 degrees, less than 70 degrees, less than 60 degrees, less than 50 degrees, less than 40 degrees, less than 30 degrees, less than 20 degrees, less than 15 degrees, less than 10 degrees, or less than 5 degrees; and (iii) a variable second injection angle that varies between any one of (i) and any one of (ii).

A7.11 The assembly of any of paragraphs A7-A7.10.2, wherein the active flow-control device is configured to inject a plurality of flow-control fluid streams into the boundary layer.

A7.11.1 The assembly of paragraph A7.11, wherein the active flow-control device is configured to systematically vary which of the plurality of flow-control fluid streams is being injected into the boundary layer at a given point in time.

A7.11.2 The assembly of any of paragraphs A7.11-A7.11.1, wherein the active flow-control device is configured to inject the plurality of flow-control fluid streams into the boundary layer via a plurality of injection orifices that is defined by the bullnose fairing.

A7.11.2.1 The assembly of paragraph A7.11.2, wherein the plurality of injection orifices is spaced-apart around a/the circumference of the bullnose fairing.

A7.11.2.2 The assembly of any of paragraphs A7.11.2-A7.11.2.1, wherein the plurality of injection orifices have an angular spacing of at least one of:
(i) at least 1 degree, at least 2 degrees, at least 3 degrees, at least 4 degrees, at least 5 degrees, or at least 10 degrees; and
(ii) less than 90 degrees, less than 45 degrees, less than 40 degrees, less than 30 degrees, less than 20 degrees, less than 15 degrees, less than 10 degrees, or less than 5 degrees.

A7.11.2.3 The assembly of any of paragraphs A7.11.2-A7.11.2.2, wherein the plurality of injection orifices includes at least one of:
(i) at least 4, at least 8, at least 9, at least 12, at least 18, at least 24, at least 36, at least 72, at least 90, at least 120, at least 180, at least 270, or at least 360 injection orifices; and
(ii) fewer than 36, fewer than 72, fewer than 90, fewer than 120, fewer than 180, fewer than 270, fewer than 360, or fewer than 720 injection orifices.

A7.12 The assembly of any of paragraphs A7-A7.11.2.3, wherein the flow-control fluid stream comprises a compressed gas stream that is generated by the jet engine.

A7.13 The assembly of any of paragraphs A7-A7.12, wherein the flow-control fluid stream comprises a synthetic jet that is generated by a synthetic jet generator.

A8. The assembly of any of paragraphs A1-A7.13, wherein the active flow-control device includes a vortex generator configured to generate a vortex within the boundary layer.

A9. The assembly of any of paragraphs A1-A8, wherein the active flow-control device comprises a suction assembly configured to remove a suction stream from the boundary layer.

A10. The assembly of any of paragraphs A1-A9, wherein the active flow-control device includes at least one of a piezoelectric actuator, a shape memory alloy actuator, a diaphragm, a pump, a compressor, and a fan.

B1. A jet engine, comprising:
an inlet configured to receive an air stream;
a compressor configured to compress the air stream;
a burner configured to combust a fuel stream with a portion of the air stream to generate a combustion stream;
a turbine configured to be powered by the combustion stream and to power the compressor;
a nozzle configured to permit the combustion stream and the portion of the air stream to be expelled from the jet engine; and
the thrust-reverser assembly of any of paragraphs A1-A10.

B2. The jet engine of paragraph B1, wherein the jet engine includes a central duct, which is configured to receive the portion of the air stream from the inlet, and a bypass duct, which is configured to receive a bypass stream from the inlet.

B3. The jet engine of paragraph B2, wherein a ratio of a flow rate of the bypass stream to a flow rate of the portion of the air stream defines a bypass ratio for the jet engine, and further wherein the bypass ratio is at least one of:
(i) at least 5, at least 10 at least 15, at least 20, or at least 25; and
(ii) less than 40, less than 35, less than 30, less than 25, or less than 20.

B4. The jet engine of any of paragraphs B2-B3, wherein the jet engine further includes a vane grid that extends across the reverser duct and is configured to regulate flow of the bypass stream through the reverser duct.

B5. The jet engine of any of paragraphs B2-B4, wherein the jet engine further includes a blocker door that is configured to selectively direct the bypass stream through the reverser duct when the thrust-reverser assembly is in the reverse-thrust configuration and to permit the bypass stream to flow through the nozzle when the thrust-reverser assembly is in the forward-thrust configuration.

B6. The jet engine of any of paragraphs B2-B5, wherein the thrust-reverser assembly further includes an outer housing that is configured to translate relative to a remainder of the jet engine to selectively permit or restrict flow of the bypass stream through the reverser duct.

B7. The jet engine of any of paragraphs B1-B6, wherein the jet engine further includes the reverser duct.

C1. An aircraft, comprising:
an airframe; and
the jet engine of any of paragraphs B1-B7.

D1. A method of resisting boundary layer separation from a bullnose fairing of a thrust-reverser assembly, the method comprising:
flowing a thrust-reverser fluid stream through a reverser duct of a jet engine that includes the thrust-reverser assembly, wherein the flowing includes generating a boundary layer adjacent the bullnose fairing, and further wherein the boundary layer includes a boundary layer fluid flow; and
energizing the boundary layer fluid flow with an active flow-control device to resist separation of the boundary layer from the bullnose fairing.

D2. The method of paragraph D1, wherein the boundary layer fluid flow defines a threshold mass flow rate prior to separation of the boundary layer from the bullnose fairing, wherein the bullnose fairing defines a radius of curvature, wherein the flowing includes flowing the boundary layer along the radius of curvature, and further wherein the radius of curvature is less than a conventional radius of curvature of a conventional bullnose fairing that produces a comparable threshold mass flow rate but that does not utilize the energizing.

D2.1 The method of paragraph D2, wherein the radius of curvature of the bullnose fairing is less than 90% less than 80%, less than 70%, less than 60%, less than 50%, or less than 40% of the conventional radius of curvature of the conventional bullnose fairing.

D3. The method of any of paragraphs D1-D2.1, wherein the boundary layer fluid flow defines a/the threshold mass flow rate prior to separation of the boundary layer from the bullnose fairing, and further wherein a length of the bullnose fairing is less than a conventional length of a/the conventional bullnose fairing that produces a/the comparable threshold mass flow rate but that does not utilize the energizing.

D3.1. The method of paragraph D3, wherein the length of the bullnose fairing is less than 90% less than 80%, less than 70%, less than 60%, less than 50%, or less than 40% of the conventional length of the conventional bullnose fairing.

D4. The method of any of paragraphs D1-D3.1, wherein the energizing includes energizing to resist separation of the boundary layer from the bullnose fairing when an average flow speed of the thrust-reverser fluid stream is at least one of:

(i) at least 100 meters/second (m/s), at least 125 m/s, at least 150 m/s, at least 175 m/s, at least 200 m/s, at least 225 m/s, at least 250 m/s, at least 275 m/s, or at least 300 m/s; and (ii) less than 350 m/s, less than 325 m/s, less than 300 m/s, less than 275 m/s, less than 250 m/s, less than 225 m/s, or less than 200 m/s.

D5. The method of any of paragraphs D1-D4, wherein the energizing includes injecting a flow-control fluid stream into the boundary layer through an injection orifice that is defined by the bullnose fairing.

D5.1 The method of paragraph D5, wherein a flow speed of the flow-control fluid stream through the injection orifice is at least one of:

(i) at least 100 meters/second (m/s), at least 125 m/s, at least 150 m/s, at least 175 m/s, at least 200 m/s, at least 225 m/s, at least 250 m/s, at least 275 m/s, at least 300 m/s, at least 350 m/s, at least 400 m/s, at least 450 m/s, or at least 500 m/s; and (ii) less than 700 m/s, less than 650 m/s, less than 600 m/s, less than 550 m/s, less than 500 m/s, less than 450 m/s, less than 400 m/s, less than 350 m/s, less than 325 m/s, less than 300 m/s, less than 275 m/s, less than 250 m/s, less than 225 m/s, or less than 200 m/s.

D5.2 The method of any of paragraphs D5-D5.1 wherein a pressure differential of the flow-control fluid stream across the injection orifice is at least 1 kilopascal (kPa), at least 5 kPa, at least 10 kPa, at least 15 kPa, at least 20 kPa, at least 25 kPa, at least 30 kPa, at least 35 kPa, or at least 40 kPa.

D5.3 The method of any of paragraphs D5-D5.2, wherein the injecting includes continuously injecting the flow-control fluid stream while the thrust-reverser fluid stream is flowing through the reverser duct.

D5.4 The method of any of paragraphs D5-D5.2, wherein the injecting includes intermittently injecting the flow-control fluid stream while the thrust-reverser fluid stream is flowing through the reverser duct.

D5.5 The method of any of paragraphs D5-D5.4, wherein the injecting includes injecting at a first injection angle as measured in a first plane that is parallel to a surface normal of the bullnose fairing and at a second injection angle as measured in a second plane that is parallel to the surface normal direction and perpendicular to the first plane.

D5.5.1 The method of paragraph D5.5, wherein the first injection angle is at least one of:

(i) at least 0 degrees, at least 5 degrees, at least 10 degrees, at least 15 degrees, at least 20 degrees, at least 30 degrees, at least 40 degrees, at least 50 degrees, at least 60 degrees, at least 70 degrees, at least 80 degrees, at least 90 degrees, at least 100 degrees, at least 110 degrees, at least 120 degrees, at least 130 degrees, at least 140 degrees, at least 150 degrees, at least 160 degrees, or at least 170 degrees;

(ii) less than 180 degrees, less than 170 degrees, less than 160 degrees, less than 150 degrees, less than 140 degrees, less than 130 degrees, less than 120 degrees, less than 110 degrees, less than 100 degrees, less than 90 degrees, less than 80 degrees, less than 70 degrees, less than 60 degrees, less than 50 degrees, less than 40 degrees, less than 30 degrees, less than 20 degrees, less than 15 degrees, less than 10 degrees, or less than 5 degrees; and (iii) a variable first injection angle that varies between any one of (i) and any one of (ii).

D5.5.2 The method of any of paragraphs D5.5-D5.5.1, wherein the second injection angle is at least one of:

(i) at least 0 degrees, at least 5 degrees, at least 10 degrees, at least 15 degrees, at least 20 degrees, at least 30 degrees, at least 40 degrees, at least 50 degrees, at least 60 degrees, at least 70 degrees, at least 80 degrees, at least 90 degrees, at least 100 degrees, at least 110 degrees, at least 120 degrees, at least 130 degrees, at least 140 degrees, at least 150 degrees, at least 160 degrees, or at least 170 degrees;

(ii) less than 180 degrees, less than 170 degrees, less than 160 degrees, less than 150 degrees, less than 140 degrees, less than 130 degrees, less than 120 degrees, less than 110 degrees, less than 100 degrees, less than 90 degrees, less than 80 degrees, less than 70 degrees, less than 60 degrees, less than 50 degrees, less than 40 degrees, less than 30 degrees, less than 20 degrees, less than 15 degrees, less than 10 degrees, or less than 5 degrees; and (iii) a variable second injection angle that varies between any one of (i) and any one of (ii).

D5.6 The method of any of paragraphs D5-D5.5.2, wherein the method further includes directing a compressed gas stream that is generated by the jet engine through the injection orifice to generate the flow-control fluid stream.

D5.7 The method of any of paragraphs D5-D5.6, wherein the method further includes generating the flow-control fluid stream with a synthetic jet generator.

D5.8 The method of any of paragraphs D5-D5.7, wherein the injecting includes injecting a plurality of flow-control fluid streams into the boundary layer.

D5.8.1 The method of paragraph D5.8, wherein the injecting includes systematically varying which of the plurality of flow-control fluid streams is being injected into the boundary layer at a given point in time.

D5.8.2 The method of any of paragraphs D5.8-D5.8.1, wherein the injecting includes injecting the plurality of flow-control fluid streams in a spaced-apart manner around a circumference of the bullnose fairing.

D5.8.3 The method of any of paragraphs D5.8-D5.8.2, wherein the plurality of flow-control fluid streams includes at least one of:

(i) at least 8, at least 9, at least 12, at least 18, at least 24, at least 36, at least 72, at least 90, at least 120, at least 180, at least 270, or at least 360 injection orifices; and (ii) fewer than 36, fewer than 72, fewer than 90, fewer than 120, fewer than 180, fewer than 270, fewer than 360, or fewer than 720 injection orifices.

D6. The method of any of paragraphs D1-D5.8.3, wherein the energizing includes generating a vortex within the boundary layer with a vortex generator.

D7. The method of any of paragraphs D1-D6, wherein the energizing includes removing a suction stream from the boundary layer with a suction assembly.

D8. The method of any of paragraphs D1-D7, wherein the energizing includes energizing with at least one of a piezo-electric actuator, a shape memory alloy actuator, a diaphragm, a pump, a compressor, and a fan.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A thrust-reverser assembly for a jet engine, wherein the thrust-reverser assembly defines a forward-thrust configuration and a reverse-thrust configuration, and further wherein the thrust-reverser assembly is in the reverse-thrust configuration, the assembly comprising:
    a bullnose fairing that defines a portion of a reverser duct;
    a thrust-reverser fluid flow through the reverser duct at an average thrust-reverser fluid flow speed of at least 100 m/s and less than 350 m/s, wherein the thrust-reverser fluid flow includes a boundary layer that is adjacent to the bullnose faring and has a boundary layer fluid flow; and
    an active flow-control device having a plurality of conduits extending through the bullnose fairing and into the boundary layer located to energize the boundary layer fluid flow such that the boundary layer resists separation from the bullnose fairing when the thrust-reverser fluid flow has the average thrust-reverser fluid flow speed of at least 100 m/s and less than 350 m/s.

2. The assembly of claim 1, wherein the active flow-control device is configured to inject a flow-control fluid stream into the boundary layer through an injection orifice that is defined by the bullnose fairing.

3. The assembly of claim 2, wherein the injection orifice forms a portion of a sweeping jet.

4. The assembly of claim 2, wherein a flow speed of the flow-control fluid stream through the injection orifice is at least 100 m/s and less than 700 m/s.

5. The assembly of claim 2, wherein a pressure differential of the flow-control fluid stream across the injection orifice is at least 20 kPa.

6. The assembly of claim 2, wherein the active flow-control device is configured to inject a plurality of flow-control fluid streams into the boundary layer.

7. The assembly of claim 6, wherein the active flow-control device is configured to systematically vary which of the plurality of flow-control fluid streams is being injected into the boundary layer at a given point in time.

8. The assembly of claim 6, wherein the active flow-control device is configured to inject the plurality of flow-control fluid streams into the boundary layer via a plurality of injection orifices that is defined by the bullnose fairing.

9. The assembly of claim 8, wherein the plurality of injection orifices is spaced-apart around a circumference of the bullnose fairing.

10. The assembly of claim 2, wherein the flow-control fluid stream comprises at least one of:
    (i) a compressed gas stream that is generated by the jet engine; and
    (ii) a synthetic jet that is generated by a synthetic jet generator.

11. The assembly of claim 1, wherein the active flow-control device includes a vortex generator configured to generate a vortex within the boundary layer.

12. The assembly of claim 1, wherein the active flow-control device includes a suction assembly configured to remove a suction stream from the boundary layer.

13. A jet engine, comprising:
    an inlet configured to receive an air stream;
    a compressor configured to compress the air stream;
    a burner configured to combust a fuel stream with a portion of the air stream to generate a combustion stream;
    a turbine configured to be powered by the combustion stream and to power the compressor;
    a nozzle configured to permit the combustion stream and the portion of the air stream to be expelled from the jet engine; and
    the thrust-reverser assembly of claim 1.

14. An aircraft, comprising:
    an airframe; and
    the jet engine of claim 13.

15. A method of resisting boundary layer separation from a bullnose fairing of a thrust-reverser assembly, the method comprising:
    flowing a thrust-reverser fluid stream through a reverser duct of a jet engine that includes the thrust-reverser assembly, wherein the flowing includes generating a boundary layer adjacent the bullnose fairing, and further wherein the boundary layer includes a boundary layer fluid flow; and
    energizing the boundary layer fluid flow with an active flow-control device having a plurality of conduits extending through the bullnose fairing and into the boundary layer to resist separation of the boundary layer from the bullnose fairing, wherein the energizing includes energizing to resist separation of the boundary layer from the bullnose fairing when an average flow speed of the thrust-reverser fluid stream is at least 100 m/s and less than 350 m/s.

16. The method of claim 15, wherein the energizing includes
    injecting a flow-control fluid stream into the boundary layer through an injection orifice that is defined by the bullnose fairing.

17. The method of claim 16, wherein the injecting the flow-control fluid stream includes injecting with a flow speed of at least 100 m/s and less than 700 m/s.

18. The method of claim 16, wherein the method further includes directing a compressed gas stream, which is generated by the jet engine, through the injection orifice to generate the flow-control fluid stream.

19. The method of claim 15, wherein the energizing includes generating a vortex within the boundary layer with a vortex generator.

20. The method of claim 15, wherein the energizing includes removing a suction stream from the boundary layer with a suction assembly.

* * * * *